(12) United States Patent
Krüger et al.

(10) Patent No.: US 10,968,093 B2
(45) Date of Patent: Apr. 6, 2021

(54) SYSTEM, CARTRIDGE, BEVERAGE PREPARATION UNIT AND METHOD FOR PRODUCING A BEVERAGE

(71) Applicant: Freezio AG, Amriswil (CH)

(72) Inventors: Marc Krüger, Bergisch Gladbach (DE); Günter Empl, Bergisch Gladbach (DE); Daniel Fischer, Romanshorn (CH)

(73) Assignee: Freezio AG, Amriswil (CH)

( * ) Notice: Subject to any disclaimer, the term of this patent is extended or adjusted under 35 U.S.C. 154(b) by 141 days.

(21) Appl. No.: 16/069,771

(22) PCT Filed: Jan. 12, 2017

(86) PCT No.: PCT/EP2017/050564
§ 371 (c)(1),
(2) Date: Jul. 12, 2018

(87) PCT Pub. No.: WO2017/121799
PCT Pub. Date: Jul. 20, 2017

(65) Prior Publication Data
US 2019/0010042 A1 Jan. 10, 2019

(30) Foreign Application Priority Data

Jan. 12, 2016 (DE) .................... 10 2016 200 254.6
Jul. 1, 2016 (DE) .................... 10 2016 212 013.1
(Continued)

(51) Int. Cl.
*B67D 1/00* (2006.01)
*B67D 1/04* (2006.01)
(Continued)

(52) U.S. Cl.
CPC .............. *B67D 1/0079* (2013.01); *A23L 2/54* (2013.01); *A47J 31/407* (2013.01);
(Continued)

(58) Field of Classification Search
CPC .. A47J 31/4492; A47J 31/4425; A47J 31/407; B67D 1/0022; B67D 7/0233;
(Continued)

(56) References Cited

U.S. PATENT DOCUMENTS 4,314,768 A 2/1982 Goglio et al.
4,323,171 A 4/1982 Whorton, III et al.
(Continued)

FOREIGN PATENT DOCUMENTS

CA 2556421 C 9/2005
DE 29825074 U1 9/2004
(Continued)

OTHER PUBLICATIONS

European Search Report for European Application 19157798, dated Jun. 14, 2019.
(Continued)

*Primary Examiner* — Dana Ross
*Assistant Examiner* — Kuangyue Chen
(74) *Attorney, Agent, or Firm* — The Dobrusin Law Firm, P.C.

(57) ABSTRACT

Disclosed is a system for producing a beverage, in particular a cold beverage, comprising a cartridge that has a reservoir filled with a beverage substance, a beverage preparation unit with a cartridge receptacle into which the cartridge can be reversibly inserted, and a cartridge discharge device which causes at least partial transfer of the beverage substance from the reservoir into a mixing chamber; furthermore, the beverage preparation unit comprises a fluid supply which opens into the mixing chamber, or the system includes a
(Continued)

movable plunger which is placed inside the reservoir and can be transferred from a starting position into a final position by means of the cartridge discharge device.

12 Claims, 3 Drawing Sheets

(30) Foreign Application Priority Data

| Sep. 27, 2016 | (DE) | 10 2016 218 507.1 |
|---|---|---|
| Sep. 27, 2016 | (DE) | 10 2016 218 509.8 |
| Sep. 29, 2016 | (DE) | 10 2016 218 884.4 |

(51) Int. Cl.

| B67D 7/02 | (2010.01) |
|---|---|
| A47J 31/40 | (2006.01) |
| B65D 85/804 | (2006.01) |
| A23L 2/54 | (2006.01) |
| A47J 31/44 | (2006.01) |
| B67D 1/08 | (2006.01) |

(52) U.S. Cl.
CPC ....... *A47J 31/4425* (2013.01); *A47J 31/4492* (2013.01); *B65D 85/8043* (2013.01); *B67D 1/0022* (2013.01); *B67D 1/0046* (2013.01); *B67D 1/0078* (2013.01); *B67D 1/04* (2013.01); *B67D 1/045* (2013.01); *B67D 7/0227* (2013.01); *B67D 7/0233* (2013.01); *A23V 2002/00* (2013.01); *B67D 2001/0811* (2013.01); *B67D 2001/0812* (2013.01)

(58) Field of Classification Search
CPC ...... B67D 1/04; B67D 1/0046; B67D 7/0227; B67D 1/0079; B67D 1/0078; B67D 2001/0812; B67D 2001/0811; B67D 1/045; B65D 85/8043; A23L 2/39; A23L 2/52; A23L 2/54; A23V 2002/00
See application file for complete search history.

(56) References Cited

U.S. PATENT DOCUMENTS

| 4,376,496 | A | 3/1983 | Sedam et al. |
|---|---|---|---|
| 4,581,239 | A | 4/1986 | Woolman et al. |
| 4,708,266 | A | 11/1987 | Rudick |
| 4,829,889 | A | 5/1989 | Takeuchi et al. |
| 4,938,387 | A | 7/1990 | Kervefors et al. |
| 5,494,194 | A | 2/1996 | Topper et al. |
| 5,836,482 | A | 11/1998 | Ophardt |
| 6,971,549 | B2 | 12/2005 | Leifheit et al. |
| 2002/0130140 | A1 | 9/2002 | Cote |
| 2003/0000964 | A1 | 1/2003 | Schroeder et al. |
| 2003/0071058 | A1 | 4/2003 | Studer et al. |
| 2003/0097314 | A1 | 5/2003 | Crisp, III et al. |
| 2004/0188459 | A1 | 9/2004 | Halliday et al. |
| 2006/0000851 | A1* | 1/2006 | Girard ............ B67D 1/0022 222/129.1 |
| 2006/0249536 | A1 | 11/2006 | Hartman et al. |
| 2008/0029541 | A1 | 2/2008 | Wallace et al. |
| 2009/0145926 | A1 | 6/2009 | Klopfenstein et al. |
| 2009/0308488 | A1 | 12/2009 | Bennett |
| 2010/0193544 | A1 | 8/2010 | Rusch et al. |
| 2012/0037662 | A1 | 2/2012 | Romanyszyn et al. |
| 2012/0052159 | A1 | 3/2012 | Doleac et al. |
| 2012/0121780 | A1 | 5/2012 | Lai et al. |
| 2012/0199227 | A1 | 8/2012 | Manser et al. |
| 2012/0207893 | A1 | 8/2012 | Krüger |
| 2012/0231124 | A1 | 9/2012 | Kamerbeek et al. |
| 2013/0061762 | A1 | 3/2013 | Carr et al. |
| 2013/0062366 | A1* | 3/2013 | Tansey ............ B67D 1/0021 222/102 |
| 2013/0340626 | A1 | 12/2013 | Oh |
| 2015/0050392 | A1 | 2/2015 | Stonehouse et al. |
| 2016/0297664 | A1 | 10/2016 | Broodryk |

FOREIGN PATENT DOCUMENTS

| DE | 102009049945 A1 | 4/2011 |
|---|---|---|
| DE | 102009052513 A1 | 5/2011 |
| EP | 1671568 A2 | 6/2006 |
| EP | 1806314 A1 | 7/2007 |
| EP | 2017219 A1 | 1/2009 |
| EP | 2017221 A1 | 1/2009 |
| EP | 2080454 A1 | 7/2009 |
| EP | 2268175 B1 | 5/2013 |
| EP | 2923772 A1 | 9/2015 |
| GB | 2020631 A | 11/1979 |
| GB | 2033333 A | 5/1980 |
| GB | 2416757 A | 2/2006 |
| WO | 81/00098 A1 | 1/1981 |
| WO | 1996/36556 A1 | 11/1996 |
| WO | 98/05586 A1 | 2/1998 |
| WO | 01/21292 A1 | 3/2001 |
| WO | 2004/099060 A2 | 11/2004 |
| WO | 2005/079361 A2 | 9/2005 |
| WO | 2006/005401 A2 | 1/2006 |
| WO | 2007/035820 A2 | 3/2007 |
| WO | 2011/084603 A1 | 7/2011 |
| WO | 2013/036564 A2 | 3/2013 |
| WO | 2014/200481 A1 | 12/2014 |
| WO | 2015/094774 A1 | 6/2015 |

OTHER PUBLICATIONS

European Search Report for European Application 19157797, dated Jun. 14, 2.019.
European Search Report for European Application 19157796, dated Jun. 14, 2019.
European Search Report for European Application 19157802, dated Jun. 14, 2019.
International Search Report for International Application PCT/EP2017/050564, dated Apr. 12, 2017.
Written Opinion for International Application PCT/EP2017/050564, dated Apr. 12, 2017.
International Preliminary Report on Patentability for International Application PCT/EP2017/050564, dated Mar. 15, 2018.

* cited by examiner

SYSTEM, CARTRIDGE, BEVERAGE PREPARATION UNIT AND METHOD FOR PRODUCING A BEVERAGE

BACKGROUND

The present invention proceeds from a system for producing a beverage, more particularly a cold beverage, comprising a cartridge which has a reservoir filled with a beverage substance, and a beverage preparation unit with a cartridge receptacle into which the cartridge can be reversibly inserted, and with a cartridge discharge device which causes at least partial transfer of the beverage substance from the reservoir into a mixing chamber.

Systems of this kind are fundamentally known from the prior art, by way of example from WO 2013/036564 A2 and WO 2005/079361 A2, and are used for the preparation of beverages from pre-portioned cartridges. The preparation of beverages with such systems is extremely convenient for the user since he has only to insert a cartridge and press a start button. The beverage preparation unit then produces the beverage fully automatically, that is, more particularly the beverage substance is mixed with a predetermined amount of liquid, more particularly cold carbonated water and directed into a drinking vessel. It is then particularly easy for the user to rapidly produce mixed drinks in this way with little effort. The user can then make a selection from a plurality of different cartridges so that he can produce different beverages according to his preferred choice.

A great challenge in the case of such systems is that of safely and completely preventing recontamination of the beverage preparation unit during production of the beverage since otherwise there is the risk of contamination or even mold forming inside the beverage preparation unit. This particularly applies for cartridges containing fruit juice, alcoholic or milky beverage substances.

With the systems known from the prior art the cartridge is normally inserted into the cartridge receptacle and the cartridge is opened on both sides, i.e. on an inlet side and an outlet side. Then water is introduced into the cartridge on the inlet side by means of a liquid supply so that the beverage is formed by mixing the beverage substance with the water already inside the reservoir in the cartridge. The beverage leaves the cartridge on the outlet side and is directed to a drinking vessel. The water flows completely through the reservoir here and thus causes the beverage substance to flow out from the reservoir. It has been seen that when introducing water directly into the reservoir filled with the beverage substance a recontamination of the supply cannot be entirely prevented because the reservoir is normally completely filled with the beverage substance and a rise in pressure takes place as a result in the reservoir when water is introduced. Both this rise in pressure in the reservoir and also the flushing through of the reservoir ensures that during and/or shortly after the beverage production very small drops, particles and/or suspended solids of the beverage substance pass into the liquid supply and lead to a continuous contamination thereof.

SUMMARY

It is therefore an object of the present invention to provide a system for the production of a beverage of the type already mentioned, wherein recontamination of the beverage preparation unit is actively prevented and which can be implemented in the simplest and most commercially viable manner possible.

This object is achieved by a system for the production of a beverage, more particularly a cold beverage, which comprises a cartridge which has a reservoir filled with a beverage substance, and a beverage preparation unit with a cartridge receptacle in which the cartridge can be reversibly inserted, and a cartridge discharge device which causes at least partial transfer of the beverage substance from the reservoir into a mixing chamber, wherein the beverage preparation unit furthermore has a liquid supply which opens into the mixing chamber.

Compared with the prior art the system according to the invention has the advantage that the liquid supply does not open into the reservoir of the cartridge but into the mixing chamber. This effectively and simply prevents in a commercially viable manner an excessively high or even an excessive pressure from building up in the reservoir. The reservoir is also not (completely) flushed through by the liquid but the system is configured in such a way that the beverage substance and the liquid pass separately from one another into the mixing chamber. The liquid accordingly passes into the mixing chamber independently of the reservoir. It could also be said that the reservoir is "by-passed" by the liquid supply. It has been shown that recontamination of the beverage preparation unit is hereby prevented in a way which is clearly more effective compared with the prior art.

A further subject or a preferred embodiment of the present invention for attaining the above-stated object is a system for the production of a beverage, more particularly a cold beverage, having a cartridge which has a reservoir filled with a beverage substance, and a beverage preparation unit with a cartridge receptacle in which the cartridge can be reversibly inserted, and a cartridge discharge device which causes at least partial transfer of the beverage substance from the reservoir into a mixing chamber, wherein the system has a movable plunger which is arranged inside the reservoir and can be transferred from a starting position into a final position by means of the cartridge discharge device.

According to the invention the cartridge discharge device in the form of the movable plunger is used to transfer the beverage substance from the reservoir into the mixing chamber whereby the plunger is moved from the starting position into the final position. The system according to the invention has the advantage compared to the prior art that the liquid which is introduced to create the beverage and is mixed with the beverage substance is not also used for transferring the beverage substance, as is the case with the prior art. This overcomes the risk of recontaminating the beverage preparation unit and more particularly the liquid supply. More particularly the movable plunger is part of the cartridge so that when transferring the beverage substance into the mixing chamber no parts of the beverage preparation unit come into contact with the beverage substance.

According to a further preferred embodiment of the present invention it is proposed that the plunger is arranged in the starting position close to the input side and wherein the plunger is displaced in the final position towards the output side. In this way practically the entire amount of the beverage substance can be pressed out from the reservoir by moving the plunger from the starting position into the final position. The plunger is here preferably arranged permanently in the reservoir as part of the cartridge. Alternatively, it would obviously also be possible that the plunger can be inserted as part of the cartridge discharge device into the reservoir after the cartridge has been inserted into the beverage preparation unit. The reservoir preferably comprises a cavity defined by a cylindrical wall wherein the plunger comprises a circular external contour whose outer diameter corresponds approximately to or is only slightly smaller than the inner diameter of the cylindrical wall. The plunger preferably comprises a sealing device, more particularly in the form of a flexible circumferential sealing lip, which seals off a narrow gap (produced from the difference between the inner diameter of the cylindrical wall and the outer diameter of the plunger) between a wall of the reservoir and the plunger. It is conceivable that the sealing lip is made from a reversibly elastic material whereby the sealing lip clings sealingly against the inner side of the wall. By way of example the sealing lip comprises an elastomer, natural rubber, neoprene, rubber, polyurethane, soft PVC (polyvinyl chloride with up to 40% plasticizer), or the like.

According to a further preferred embodiment of the present invention it is proposed that the cartridge discharge device comprises a movable ram which can be inserted into the cartridge on an input side of the cartridge in order to press the beverage substance out from the cartridge on an output side of the cartridge. The cartridge-side end of the ram is then preferably provided for interaction with the plunger arranged in the cartridge in such a way that when inserting the ram into the cartridge the ram strikes the plunger located in the starting position which is then moved by the ram into the final position. Advantageously the beverage substance is thus transferred from the reservoir into the mixing chamber without the ram coming into contact with the beverage substance. The ram can thus be part of the beverage preparation unit and can be re-used whilst the contaminated plunger is part of the cartridge and is thus replaced when changing the cartridge. Recontamination of the beverage preparation unit is thus effectively prevented. The ram is more particularly drawn back and out from the cartridge again before removing the spent cartridge from the beverage preparation unit.

Alternatively, it would in principle also be possible that the cartridge-side end of the ram comprises the plunger. In this case the plunger would be part of the beverage preparation unit and not of the cartridge. This solution is however less preferred owing to the risk of recontamination. On the other hand, however, this solution is more commercially viable to implement since the plunger then does not represent a disposable product here.

According to a further preferred embodiment of the present invention it is proposed that the cartridge has in the region of the insert side a sealing element which is opened by inserting the plunger, wherein more particularly the sealing element comprises a sealing film which tears as the plunger is inserted. The sealing element preferably ensures that the reservoir is hermetically sealed at least prior to insertion into the beverage preparation unit so that no beverage substance can escape and the aroma of the beverage substance remains during storage and transport of the cartridge. The sealing film is preferably arranged in such a way that the plunger is arranged in the starting position between the sealing element and the beverage substance so that the sealing film is torn away by the ram as the ram is introduced. The cartridge is preferably automatically opened on its input side by inserting the ram. It would however also be conceivable that the sealing film is arranged between the plunger arranged in the starting position, and the beverage substance so that the sealing film is torn away by the moving plunger as the ram is inserted.

According to a further preferred embodiment of the present invention it is proposed that the beverage preparation unit has a guiding unit for the motor-driven insertion of the ram into the cartridge, wherein the guiding unit for the ram comprises a straight or curved guide element for inserting the ram, and wherein the guiding unit has an electric linear motor. The ram can thus advantageously be introduced into the cartridge in a motor-driven manner. In this case the user need only trigger insertion by means of a press button or the like. The use of a curved guide element has the advantage that the structural height of the guiding unit can be reduced. In this case the ram preferably has a flexible structure. Otherwise it is formed rigid or semi-rigid. The electric linear motor preferably comprises a pinion which sits on a drive shaft of an electric motor (by way of example a three-phase asynchronous machine or a three-phase synchronous machine) and engages in a gear rack, wherein the gear rack is coupled to the ram or is already part of the ram. By rotating the pinion, the gear rack is moved and thus the ram is driven into the cartridge or is moved out from the cartridge. It is also conceivable as an alternative that the aforementioned electric drive comprises an electric-motorized spindle drive, wherein a spindle is moved in translation by means of a pinion, wherein the spindle is coupled to the ram or is already part of the ram. Alternatively, the electric linear motor comprises a solenoid linear motor. Those skilled in the art know that a hydraulic linear motor could also be used in place of the electric linear motor.

Alternatively, it is proposed that the cartridge discharge device comprises a compressed air source for blowing compressed air into the reservoir on an input side of the cartridge, wherein the system is designed more particularly in such a way that the beverage substance is pressed directly out of the reservoir by the compressed air, or that the plunger is moved by the compressed air from the starting position into the final position. Instead of the aforementioned solution with an electric or hydraulic linear motor, it is thus also conceivable to press the beverage substance out from the reservoir into the mixing chamber directly by means of compressed air (the compressed air is introduced here on the input side directly into the reservoir which is not provided with a plunger) or indirectly for this to transfer the plunger from the starting position into the final position by means of compressed air (the compressed air is introduced here on the input side into the reservoir, namely above the plunger). In both variations the risk of recontamination is advantageously reduced most of all by using compressed air (more particularly instead of the ram). It is conceivable that the beverage preparation unit is equipped here with a compressed air cartridge which is changed when necessary. It would also be conceivable alternatively that the beverage preparation unit is fitted with a corresponding compressor to produce compressed air. In the event that the beverage preparation unit has in any case a carbonator which comprises a $CO_2$ cartridge, this $CO_2$ cartridge is preferably used simultaneously, also as a compressed air source for the cartridge discharge device.

As an alternative to using compressed air it is also possible to use a negative pressure. With this alternative embodiment the cartridge discharge device has a negative pressure device for drawing the beverage substance out from the reservoir by means of a vacuum, wherein the system is configured more particularly in such a way that the beverage substance is sucked by the vacuum directly out from the reservoir or that the plunger is transferred from the starting position to the final position by means of the vacuum.

According to a further preferred embodiment of the present invention it is proposed that the mixing chamber has a beverage outlet through which the beverage formed by mixing the beverage substance with the liquid is discharged, wherein the system is preferably configured in such a way that the beverage can be introduced from the beverage outlet directly into a portable vessel. Thus advantageously neither the beverage substance nor the finished beverage mixed in the mixing chamber passes into contact with further parts of the beverage preparation unit so that recontamination is prevented. This is particularly the case when the mixing chamber is part of the cartridge and thus is changed as a replacement product after each beverage production process.

According to a further preferred embodiment of the present invention it is proposed that the liquid supply is fed with liquid which is cooled by a cooling unit, wherein the cooling unit is part of the beverage preparation unit or of a separate refrigerator which is in active connection with the beverage preparation unit. Advantageously, cold beverages can thus be prepared even when the cartridge is not cooled and is by way of example at room temperature. The integration of the system in an existing refrigerator has the advantage that the existing cooling unit of the refrigerator can be easily used efficiently for the beverage preparation unit as well. Particularly in the case of so-called "side-by-side" refrigerators (often also called American-style refrigerators) there is sufficient structural space in the front for integrating the system. It is conceivable that the beverage reparation unit is an accessory set for a refrigerator of this kind. The cooling unit preferably comprises a compressor cooling unit, an absorber cooling unit or a thermo-electric chiller.

According to a further preferred embodiment of the present invention it is proposed that the liquid supply is fed with liquid which is admixed with carbon dioxide by a carbonator. More advantageously it is thus also possible with the system to produce soft drinks admixed with carbon dioxide. The carbonator is preferably part of the beverage preparation unit, wherein the carbonator more particularly has a receptacle for a $CO_2$ cartridge and a supply device for admixing the liquid with $CO_2$ from the $CO_2$ cartridge.

According to a further particularly preferred embodiment of the present invention it is proposed that the mixing chamber is formed as part of the replaceable cartridge. In this way contamination of the beverage preparation unit by the beverage substance is effectively avoided because only parts of the replaceable single-use cartridge come into contact with the beverage substance. A further sealing element is preferably arranged between the reservoir and the mixing chamber and is opened on inserting the cartridge into the cartridge receptacle or on activating the cartridge discharge device. The further sealing element serves to close the cartridge on the output side during transport or storage in an aroma-sealed manner. The cartridge is more particularly closed aroma-sealed on the input side by the sealing element described further above, so that the reservoir is closed completely aroma-sealed prior to inserting the cartridge into the cartridge receptacle and more particularly prior to the start of the beverage preparation process whereby the cartridge can have by way of example a long shelf life. It is conceivable that the further sealing element comprises a sealing film which is opened, and more particularly torn, through a rise in pressure in the reservoir as the plunger is moved from the starting position into the final position. More advantageously with this system the further sealing element is opened automatically during production of the beverage.

The mixing chamber which is formed as part of the cartridge preferably has a quick-fit coupling to connect the mixing chamber with the liquid supply when the cartridge is inserted into the cartridge receptacle. In this way the mixing chamber is brought automatically into liquid connection with the liquid supply during insertion. The quick-fit coupling more particularly has a coupling pipe and a coupling socket which receives the coupling pipe in the coupled state, wherein the coupling pipe and/or the coupling socket comprises a seal and/or wherein in the coupled state the coupling pipe snap-fits into the coupling socket and/or wherein the coupling pipe is part of the beverage preparation unit and the coupling socket is part of the mixing chamber. It is conceivable that the quick-fit coupling comprises a plug-in connector, mono coupler, multicoupler, clean break coupling, closure coupling, through coupling and/or passage coupling.

According to a further particularly preferred embodiment of the present invention it is proposed that the cartridge receptacle has a form-fitting element which receives the cartridge in form-fitting manner, wherein the cartridge is preferably held additionally in force-fitting manner in the cartridge receptacle. It is conceivable by way of example that the form-fitting element comprises at least one spring element and/or detent element which is compressed and/or engaged by inserting the cartridge into the cartridge receptacle, wherein the cartridge receptacle preferably has a lead-in chamfer and/or a positioning aid. The cartridge receptacle preferably has an upper form-fitting element which holds the cartridge in the region of its input side, and a lower form-fitting element which holds the cartridge in the region of the output side and/or the mixing chamber.

The cartridge receptacle is preferably configured so that the cartridge can have between the upper form-fitting element and the lower form-fitting element a diameter which is greater than or smaller than the diameter in the region of the upper and lower form-fitting elements. In this way cartridges can be used which have different geometric configurations at least in an intermediate region, i.e. in those regions in which the upper and lower form-fitting elements do not engage. Thus, cartridges with reservoirs of different volumes can more particularly be used. By way of example cartridges for spirit-containing beverages can be prepared with smaller amounts of beverage substance than for alcohol-free, caffeine-containing and carbonated soft drinks.

The person skilled in the art understands that the mixing chamber could also alternatively be part of the beverage preparation unit. In this scenario the mixing chamber would have to be flushed through with water after the production of each beverage so that no residues of the beverage substance remain in the mixing chamber.

According to a further particularly preferred embodiment of the present invention it is proposed that a screen element is arranged inside the cartridge on which the cartridge discharge device acts in order to transfer the beverage substance from the reservoir into the mixing chamber, wherein the screen element is arranged between the cartridge discharge device and the beverage substance. Advantageously the cartridge discharge device is insulated from the beverage substance by means of the screen element so that there can be no recontamination of the beverage preparation machine via the cartridge discharge device. In order that it is nevertheless possible to empty the reservoir the screen element has a flexible structure and is more particularly designed as a bellows or soft bag element. The screen element is then always arranged inside the reservoir, wherein the beverage substance is arranged inside the bellows or the soft bag element. When the cartridge discharge device, thus more particularly the ram or compressed air act on the bellows or the bag element, the bellows collapses inside the reservoir or the bag element is compressed inside the reservoir so that the beverage substance is transferred from the reservoir into the mixing chamber. In other words:

the bellows or the soft bag element extend in the starting position from the output side of the cartridge at least partially parallel to the cartridge wall up to the input side of the cartridge and are moved by the cartridge discharge device towards the output side during the beverage production process.

A further subject of the present invention for achieving the object mentioned above is a cartridge for the system more especially according to the invention for producing a beverage, wherein the cartridge can be inserted into the cartridge receptacle of the beverage preparation unit, and wherein the cartridge has the reservoir which is filled with the beverage substance. The reservoir is preferably filled with a pre=portioned amount of beverage substance which is required for producing one drink portion, by way of example a drinking glass filled with the desired beverage. A drinking glass typically holds 0.1 liter, 0.2 liter, 0.3 liter, 0.33 liter, 0.35 liter, 0.366 liter, 0.5 liter, or 1 liter of liquid. More advantageously the user can easily create different beverages by selecting a specific cartridge which contains the corresponding beverage substance for creating the desired beverage, inserting it into the cartridge receptacle and starting the beverage production process on the beverage preparation unit. The beverage is then made automatically, directed into a drinking vessel and thus provided to the user. The spent cartridge is then removed and disposed of. Since recontamination of the beverage preparation unit within the sense according to the invention is avoided, there is then advantageously no need for flushing or rinsing before making a new beverage with another flavor.

The beverage substance preferably comprises a liquid beverage substance, such as soft drinks, sweetened drinks, fruit juices, fruit nectars, fruit juice concentrates, fruit spritzers, lemonades, fizzy drinks, energy drinks, isotonic drinks, beer, mixed beer drinks, table water, fizzy drink, mineral waters, spirits, alcopops, fruit wine, vegetable juices, vegetable nectars, sparkling wine, fruit sparkling wine, alcoholic mixed drinks, wine, wine spritzers, cocktails, coffee, tea, iced tea, milk, chocolate drinks, caffeinated, alcoholic, (fruit) sugar-containing and/or carbonated beverages and mixtures and modifications thereof. It is also conceivable that the beverage substance more particularly only comprises fluid pre-mix ingredients for the aforementioned beverages so that said beverages only arise when the pre-mix ingredients are mixed with water in the mixing chamber. It is also conceivable that the beverage substance contains additionally or exclusively particulate substances, such as soluble powders, sherbet powders or the like.

According to a particularly preferred embodiment of the present invention it is proposed that the cartridge has a plunger which is arranged in the reservoir and which can be transferred between a starting position close to an input side of the cartridge and a final position which is displaced from the input side towards an output side. In this way the beverage substance is conveyed from the reservoir into the mixing chamber. The mixing chamber is preferably part of the cartridge and is more particularly arranged underneath the reservoir when the cartridge is inserted into the cartridge receptacle.

The plunger preferably has a sealing device, more particularly in the form of a flexible circumferential sealing lip which seals off a gap between a wall of the reservoir and the plunger.

The plunger preferably has a ram receptacle to receive a ram of the beverage preparation unit, wherein the plunger is designed to be transferred from the starting position into the final position by inserting the ram into the reservoir so that the beverage substance is directed out from the reservoir into a mixing chamber arranged in the liquid direction behind the reservoir and more particularly below the reservoir. The ram receptacle can be by way of example a funnel-shaped receptacle, a depression, a protrusion or the like which centers the ram on the plunger and secures it from sliding sideways.

According to a preferred embodiment of the present invention it is proposed that the cartridge has in the region of the insert side a sealing element which is opened by inserting the plunger, wherein more particularly the sealing element comprises a sealing film which is torn as the plunger is inserted. Between the reservoir and the mixing chamber there is arranged a further sealing element which is opened during insertion of the cartridge into the cartridge receptacle or during activation of the cartridge discharge device. The further sealing element too preferably comprises a sealing film which is opened and more particularly torn by a rise in pressure in the reservoir as the plunger is transferred from the starting position into the final position. The sealing element and the further sealing element, as already described in detail above, serve to close the reservoir in an aroma-sealed manner during transport or storage.

The cartridge preferably has a mixing chamber which can be brought into liquid connection with a liquid supply of the beverage preparation unit. The mixing chamber preferably comprises here a quick-fit coupling for connecting the mixing chamber to the liquid supply when the cartridge is inserted into the cartridge receptacle.

The mixing chamber preferably has a beverage outlet through which the beverage formed by mixing the beverage substance with the liquid is dispensed, wherein the system is preferably designed in such a way that the beverage can be directed from the beverage outlet directly into a portable vessel. Advantageously, neither the beverage substance nor the beverage produced from the beverage substance in the mixing chamber thus pass into direct contact with a part of the beverage preparation unit so that recontamination can be actively prevented.

According to a preferred embodiment of the present invention it is proposed that the cartridge has at least one connecting element which during insertion of the cartridge into the beverage preparation unit interacts with the cartridge receptacle in order to hold the cartridge in the cartridge receptacle. It is conceivable that the connecting element comprises an insert element which engages in a form-fitting element, more particularly in the form of a spring and/or detent element of the cartridge receptacle.

According to a preferred embodiment of the present invention it is proposed that the cartridge has an upper connecting element in the region of the input side and a lower connecting element in the region of the output side and/or the mixing chamber. The cartridge preferably has in an intermediate region between the input side and the output side a diameter which is larger than or smaller than the diameter of the cartridge in the region of the input side and/or the output side. In this way cartridges with reservoirs of different volumes can be inserted into the cartridge receptacle. It is conceivable that the diameter of the cartridge in the region of the input side is substantially identical with the diameter of the cartridge in the region of the mixing chamber and/or the output side. Alternatively the diameter on the input side can however also be different from the diameter on the output side so that a rotational lock is produced and correct insertion of the cartridge into the cartridge receptacle is ensured.

The cartridge is preferably formed rotationally symmetrical along its longitudinal axis so that insertion of the cartridge into the cartridge receptacle is easier for the user.

According to a preferred embodiment of the present invention it is proposed that a screen element is arranged inside the cartridge, wherein the screen element preferably comprises a bellows or a soft bag element arranged inside the reservoir, wherein the beverage substance is arranged inside the bellows or the soft bag element. The bellows or the bag element consist more particularly of a fluid-impermeable and/or gas-impermeable foil. The bellows or the bag element are preferably attached to the cartridge in the region of the output side of the cartridge.

A further subject of the present invention is a beverage preparation unit for the system more particularly according to the invention for the preparation of a beverage, wherein the beverage preparation unit has the cartridge receptacle in which the cartridge more particularly according to the invention can be reversibly inserted, a cartridge discharge device which causes an at least partial transfer of the beverage substance from the reservoir into a mixing chamber, and the liquid supply which opens into the mixing chamber.

According to a preferred embodiment of the present invention it is proposed that the cartridge discharge device comprises a movable ram which can be inserted on an input side of the cartridge into the cartridge in order to press the beverage substance out from the cartridge on an output side of the cartridge. The beverage preparation unit preferably has a guiding unit for the motor-driven supply of the ram into the cartridge, wherein the guiding unit of the ram comprises a straight or curved guide element for inserting the ram, and wherein the guiding unit has an electric or hydraulic linear motor and more particularly a spindle drive.

According to a preferred embodiment of the present invention it is proposed that the beverage preparation unit comprises the mixing chamber, wherein the mixing chamber can be removed from the rest of the beverage preparation unit. In this embodiment the mixing chamber is not part of the cartridge but can be inserted separately from the cartridge into the beverage preparation unit and removed (for cleaning and maintenance purposes). The mixing chamber can advantageously be used multiple times. It is conceivable that the beverage preparation unit with an automatic rinsing and cleaning mechanism for cleaning the mixing chamber after each beverage production process or after a specific number of beverage production processes.

It is conceivable that the beverage preparation unit has a cooling system for cooling a liquid which is supplied to the liquid supply.

A further subject of the present invention is a method for the production of a beverage, more particularly with the system according to the invention, comprising the following steps:

- inserting a cartridge filled with a beverage substance into a cartridge receptacle of a beverage preparation unit,
- transferring the beverage substance from a reservoir of the cartridge into a mixing chamber by means of a cartridge discharge device,
- supplying a liquid into the mixing chamber by means of a liquid supply,
- discharging the beverage produced in the mixing chamber by mixing the beverage substance with the liquid, by means of a beverage outlet.

The method according to the invention has, like the system according to the invention described above, the advantage over the prior art that recontamination of the beverage preparation unit is substantially avoided since the liquid supplied for mixing with the beverage substance is directed not into the reservoir but into the mixing chamber. Since the liquid is not used for transferring the beverage substance the beverage substance is preferably pressed by a plunger out from the reservoir into the mixing chamber whereby the plunger is moved by means of the cartridge discharge device from a starting position into a final position. It is conceivable that the plunger is moved here by means of a cartridge discharge device in the form of a ram acting on the plunger or by compressed air. The ram is preferably inserted motor-driven into the cartridge by means of a guiding unit and then acts on the plunger in order to move the plunger from the starting position into the final position.

It would also be conceivable as an alternative that the beverage substance is transferred from the reservoir into the mixing chamber by compressed air or negative pressure According to a preferred embodiment of the present invention it is proposed that the liquid is cooled and/or carbonated prior to flowing into the mixing chamber.

According to a further preferred embodiment of the present invention it is proposed that during insertion of the ram into the cartridge a sealing element sealing the cartridge is opened, wherein the sealing element preferably comprises a sealing film which is torn by the ram. It is conceivable that by transferring the beverage substance towards the mixing chamber a further sealing element which between the reservoir and the mixing chamber is opened, wherein the further sealing element preferably comprises a sealing film which is torn by the rise in pressure in the reservoir.

According to a further preferred embodiment of the present invention it is proposed that the cartridge discharge device acts on a screen element arranged inside the cartridge in order to transfer the beverage substance from the reservoir into the mixing chamber, wherein the screen element is folded or compressed during this step.

Further details, features and advantages of the invention are apparent from the drawings, as well as from the following description of preferred embodiments with reference to the drawings. The drawings illustrate embodiments of the invention given merely by way of example and do not restrict the essential inventive concept.

DETAILED DESCRIPTION

In the various figures identical parts are always provided with the same reference numerals and are therefore generally only mentioned or listed once.

Figure 1:
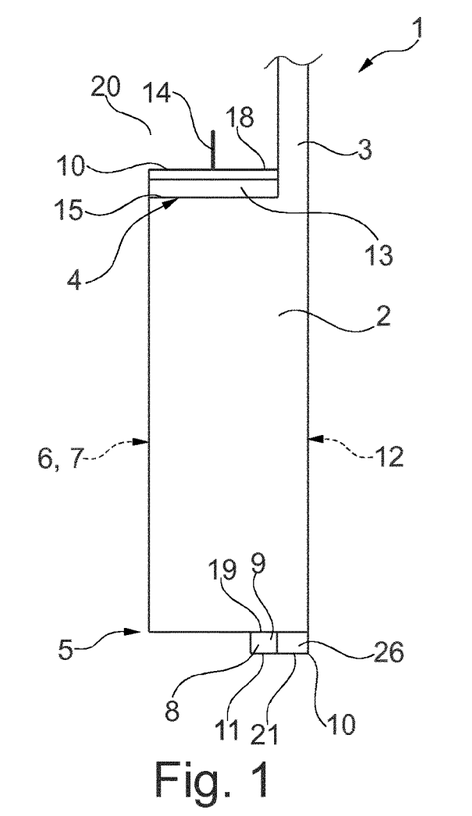
FIG. 1 shows a diagrammatic sectional view of a system, a cartridge, a beverage preparation unit and a method for the production of a beverage according to an exemplary embodiment of the present invention.

FIG. 1 shows a diagrammatic sectional view of a system 1 according to the invention having according to the invention a cartridge 2 and a beverage preparation unit 3 according to the invention for the production of a beverage by means of a method according to the invention according to an exemplary first embodiment of the present invention.

The present system 1 comprises the beverage preparation unit 3 in which replaceable cartridges 2 which are filled with a specific beverage substance 7 are insertable. A corresponding beverage is produced inside the beverage preparation unit 3 by means of the beverage substance 7 and where applicable an additional water source. The cartridge 2 is then preferably filled with a pre-portioned amount of beverage substance 7 which is required to produce a targeted drink portion, by way of example a drinking glass filled with the desired beverage. There are in particular a plurality of different cartridges 2 available which are filled with different beverage substances 7 for producing different beverages. When the user of the system 1 would like to drink a specific beverage he need only select from the plurality of different cartridges 2 that cartridge 2 which contains the corresponding beverage substance 7 to produce the desired beverage, insert it into a cartridge receptacle 10 of the beverage preparation unit 3, and if appropriate start the beverage production process on the beverage preparation unit 3, for example by pressing a start button, suitably touching a touch-sensitive display, through gesture or voice control or by means of a suitable app on a mobile telephone. It is also conceivable that the beverage production process is automatically controlled when the insertion of a new cartridge 2 into the cartridge receptacle 10 is recognized. In each of the aforementioned cases the desired beverage is then produced automatically, directed into a drinking vessel and thus provided to the user. The spent cartridge 2 is then removed and disposed of. The beverage preparation unit 3 is then ready again to be filled with any desired new cartridge 2 in order to produce a further beverage.

The beverage substance 7 preferably comprises liquid pre-mix ingredients for soft drinks, such as caffeinated, carbonated, fruit- and/or sugar-containing lemonades and juices, beer (mixed) beverages or other alcoholic or non-alcoholic mixed beverages.

The cartridge 2 comprises a cylindrical container with an input side 4 (arranged at the top in the drawing) and an output side 5 (arranged at the bottom in the drawing). Inside the container the cartridge 2 has a reservoir 6 which is filled with the liquid beverage substance 7. In the region of the output side 5 the cartridge 2 has a mixing chamber 8 (i.e. the mixing chamber is here part of the cartridge 2) which is fixedly connected to the container. The reservoir 6 opens in this region into a transfer opening 9 through which the beverage substance can pass from the reservoir 6 into the mixing chamber 8. The base of the reservoir 6 in the present example is funnel-shaped, wherein the transfer opening 9 is arranged in the center of the funnel-shaped base. The transfer opening 9 then runs into an optional short pipe member which protrudes into the mixing chamber 8.

The mixing chamber 8 has a beverage outlet 11 through which the beverage produced inside the mixing chamber 8 leaves the mixing chamber and is passed more particularly directly into the drinking vessel (not shown), i.e. without parts of the beverage preparation unit 3 coming into contact with the beverage. In this way recontamination of the beverage preparation unit 3 is avoided. The drinking vessel is more particularly arranged directly underneath the beverage outlet 11.

The mixing chamber 8 has a quick-fit coupling 26 with which the mixing chamber 8 can be attached to a liquid supply 12 of the beverage preparation unit 3. The quick-fit coupling 26 is configured in such a way that on inserting the cartridge 2 into the cartridge receptacle 10 a liquid connection is produced between the mixing chamber 8 and the liquid supply 12. During the beverage production process, liquid, more particularly cooled and carbonated drinking water, passes through this liquid connection from the liquid supply into the mixing chamber 8. Furthermore, during the beverage production process, beverage substance 7 passes from the reservoir 6 through the transfer opening 9 into the mixing chamber 8. By mixing the beverage substance 7 with the liquid in the mixing chamber 8 the beverage is formed which then leaves the mixing chamber 8 through the beverage outlet 11. The liquid supply 12 comprises a water pipe which functions as a bypass to the cartridge 2. The liquid need thus not be pumped through the reservoir 6 but only meets the beverage substance 7 in the mixing chamber 8.

In order to transfer the beverage substance 7 from the reservoir 6 into the mixing chamber 8 the cartridge 2 has a plunger 13 arranged in a movable manner in the reservoir 6. The plunger 13 comprises in the present example a disc-like element whose diameter corresponds substantially to the diameter of the reservoir 6. The remaining gap between the reservoir wall and the plunger 13 is preferably sealed by a sealing device 15 in the form of a flexible circumferential sealing lip or a circumferential flexible sealing bead.

The beverage preparation unit 3 has a cartridge discharge device 34 for actuating the plunger 13. The cartridge discharge device 34 has a ram 16 (see FIG. 5) which is configured to transfer the plunger 13 from a starting position into a final position in order to press the beverage substance 7 into the mixing chamber 7. In the delivery state of the cartridge 2 the plunger 13 is arranged in the output position close to the input side 4. The plunger 13 has on its side facing away from the beverage substance 7 a ram receptacle 14 for holding the ram 16 (not shown in FIG. 1). After the beverage production process has been started the ram 16 is moved towards the input side 4 into the cartridge 2 and passes into the ram receptacle 14. The ram 16 is then moved further into the cartridge 2 whereby the plunger 2 is moved from the input side 4 towards the output side 5 until it assumes a final position close to the output side 5. By moving the plunger 13 through the reservoir 6 the beverage substance 7 is pressed out from the reservoir 6 into the mixing chamber 8 in order to mix with the liquid in the mixing chamber 8 to produce the beverage. After the beverage production process is concluded the ram 16 is driven out again from the cartridge 2 so that the empty or spent cartridge 2 can be removed again from the beverage preparation unit 3. In order that the ram 16 can be driven into the cartridge 2 on the input side 4, the container has a ram opening 17 on the input side 4. It is conceivable that the ram opening 17 is limited to the cross section of the ram 16 or corresponds to the overall cross section of the plunger 13 or reservoir 6.

In order that the beverage substance 7 does not emerge from the cartridge 2 during storage and transport of the cartridge 2 and retains the aroma, the cartridge 2 is sealed in an air-, liquid- and aroma-tight manner in the starting state. For this purpose, the cartridge 2 has a sealing element 18 in the form of a thin sealing film at its input side 4 as well as a further sealing element 19 in the form of a thin sealing film in the region of the output side 5, more particularly inside the transfer opening 9. The two sealing films are configured in such a way that they tear easily under pressure. On inserting the cartridge 2 into the cartridge receptacle 10 the two sealing films are still intact. As soon as the ram 16 moves into the cartridge 2 and thus comes into contact with the sealing film on the input side 4, the sealing film tears so that the ram 16 passes to the plunger 13. When the plunger 13 is then pressed down the pressure inside the reservoir 6 is increased until the sealing film in the transfer opening 9 tears so that the beverage substance 7 passes into the mixing chamber 8.

It would also be optionally conceivable that a piercing element which projects in the direction of the sealing film inside the transfer opening 9 is arranged inside the mixing chamber 8 so as to come into contact with the sealing film when the sealing film expands towards the mixing chamber 8 under the pressure building up in the reservoir 6 so that the sealing film is torn through contact of the expanded sealing film with the piercing element, or tearing is at least enhanced.

The cartridge receptacle 10 has in the region of the input side 4 an upper form-fitting element 20 and in the region of the output side 5 a lower form-fitting element 21. The upper and the lower form-fitting element 20, 21 are designed so that the cartridge 2 can be arranged through vertical movement between the two form-fitting elements 20, 21 in the cartridge receptacle 10 and are held in this position with form-fitting engagement by the two form-fitting elements 20, 21 or between the two form-fitting elements 20, 21. The lower form-fitting element 21 has for this purpose a dished socket which is adapted to the outer shaping of the underside of the cartridge. The upper form-fitting element 20 has two lateral detent elements 22 which are spring-tensioned towards the cartridge 2 and during insertion of the cartridge 2 engage with form-fitting and force-fitting engagement in two corresponding lateral sockets 24 of the cartridge 2 which function as counter detent elements 23. The cartridge 2 is thus fixed inside the cartridge receptacle 10 during the beverage production process.

Figure 2A:
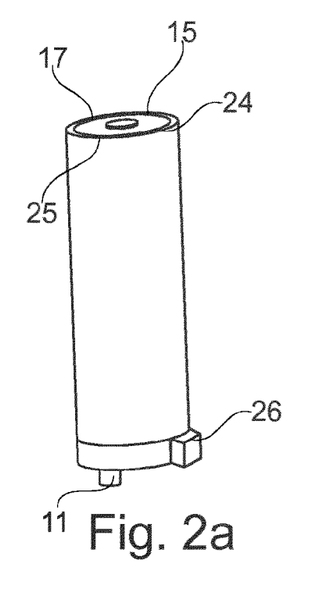
FIG. 2a shows a detailed view of the cartridge according to the first exemplary embodiment of the present invention.

FIG. 2a shows a detailed view of the cartridge 2 according to the first exemplary embodiment of the present invention. In this perspective view the plunger 13 can be seen on the upper side of the cartridge 2 and occupies the entire cross section of the reservoir 6. The plunger 6 is sealed at its edge from the reservoir wall with the circumferential sealing device 15 in the form of a flexible circumferential sealing lip or a circumferential flexible sealing bead.

The sealing element which extends over the plunger and seals the reservoir at the top or from the input side 4 in an aroma-tight manner is configured as a thin transparent sealing film which can be easily pierced by the ram and can therefore not be clearly seen in FIG. 2a.

A laterally protruding flange 25 can be seen on the upper edge of the reservoir wall and has the two lateral sockets 24 in the form of recesses. When inserting the cartridge 2 into the cartridge receptacle 10 the counter detent elements 23 engage in these recesses.

At the lower end of the reservoir 6 the cartridge 2 has the mixing chamber 8. The beverage outlet 11 as well as the quick-fit coupling 26 can be seen in FIG. 2a. It can be seen that in the present example the quick-fit coupling 26 consists of a tubular socket in which or over which the associated pipe end of the liquid supply 12 is arranged in order to couple the mixing chamber 8 with the liquid supply.

Figure 2B:
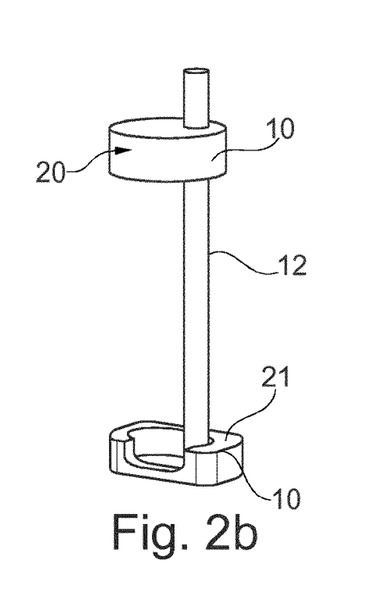
FIG. 2b shows a detailed view of the beverage preparation unit according to the first exemplary embodiment of the present invention.

FIG. 2b shows a detailed view of details of the beverage preparation unit 3 according to the first exemplary embodiment of the present invention. This perspective view shows on one side the liquid supply 12 which is designed in the form of a pipe bypassing the cartridge 2 to supply the liquid, and also the cartridge receptacle 10 in the form of the upper and lower form-fitting elements 20, 21. The lower form-fitting element 21 is adapted to the outer contour of the underside of the mixing chamber 8 and has a recess both for the beverage outlet 11 and for the quick-fit coupling 26.

Figure 2C:
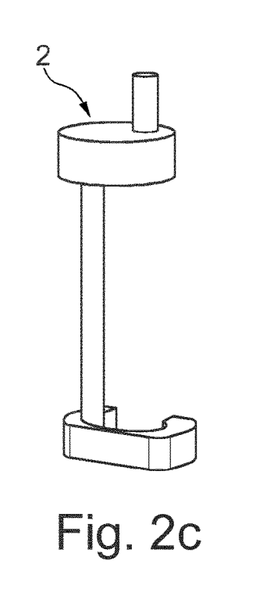
FIG. 2c shows a diagrammatic view in which the cartridge illustrated in FIG. 2a is inserted into the beverage preparation unit illustrated in FIG. 2b.

FIG. 2c shows a diagrammatic view in which the cartridge 2 illustrated in FIG. 2a is inserted into the beverage preparation unit 3 illustrated in FIG. 2b.

The beverage preparation unit 3 is either a separate stand-alone machine or a part of a refrigerator (not shown). It is conceivable by way of example that the beverage preparation unit 3 is built into the front of such a refrigerator. The liquid supply 12 is preferably fed with liquid which is previously cooled by the cooling unit (not shown). The cooling unit is then in turn either part of the beverage preparation unit 3 (in the case of the stand-alone machine) or part of the refrigerator which is in active connection with the beverage preparation unit 3. In the case of the stand-alone machine the cooling unit can be a compressor cooling unit, an absorber cooling unit or a thermo-electric chiller.

The liquid supply 12 is furthermore optionally supplied with liquid which was previously admixed with carbon dioxide by a carbonator (not shown). In this way soft drinks admixed with carbon dioxide can be produced. The carbonator is preferably part of the beverage preparation unit 3 wherein the carbonator more particularly has a receptacle for a replaceable $CO_2$ cartridge and where applicable a supply device for admixing the liquid with $CO_2$ from the $CO_2$ cartridge.

Figure 3:
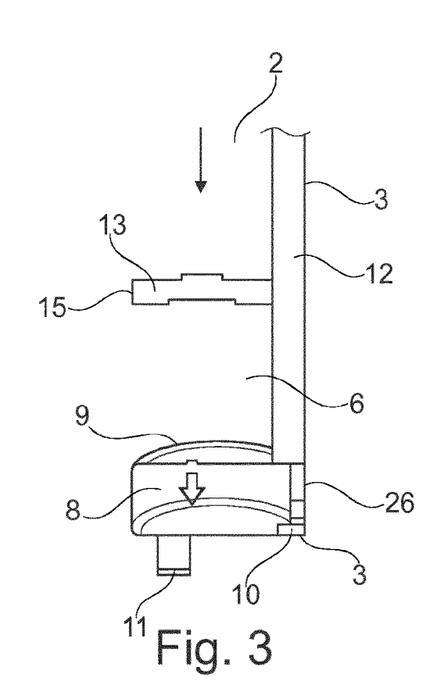
FIG. 3 shows the system and the method for the production of a beverage according to an exemplary second embodiment of the present invention.

FIG. 3 shows the system 1 and the method for the production of a beverage according to an exemplary second embodiment. The situation is shown at the moment when the plunger 13 is transferred by means of the cartridge discharge device 34 from its starting position close to the input side 4 into its final position close to the output side 5 in order to transfer the beverage substance 7 from the reservoir 6 into the mixing chamber 8. In this example in order to move the plunger 13 excess pressure is produced in the cartridge 2 or in the reservoir 6 above the plunger 13 whereby the plunger 13 moves in the direction of the mixing chamber. The rising pressure below the plunger 13 leads (as described above) to the further sealing element 19 tearing and thus to the transfer opening 9 being released. When the plunger 13 has occupied the lower final position the supply of compressed air is interrupted again so that the cartridge 2 can be removed again after completion of the beverage production process.

To produce the excess pressure the by means of the cartridge discharge device 34 is fitted here with a replaceable compressed air cartridge or with a compressor. In the case where the beverage preparation unit 3 has in any case a carbonator (see above) which comprises a $CO_2$ cartridge, this $CO_2$ cartridge is preferably simultaneously also used as a compressed air source for the cartridge discharge device.

Figure 4:
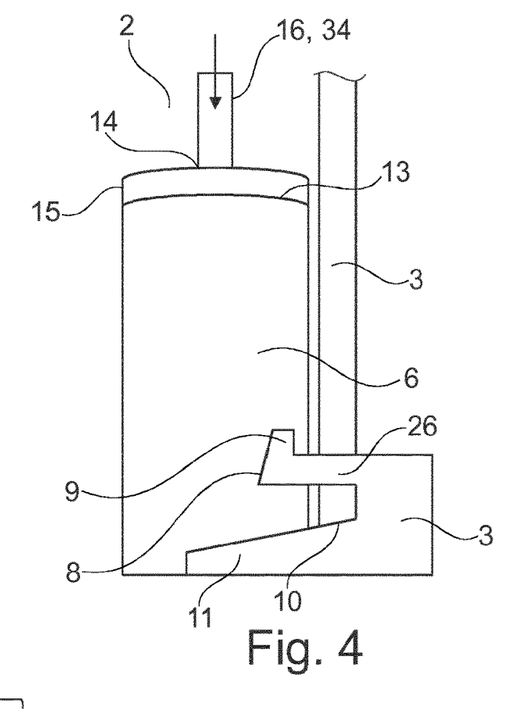
FIG. 4 shows the system and the method for the production of a beverage according to the first embodiment of the present invention.

FIG. 4 shows the system 1 and the method for the production of a beverage according to the first embodiment shown at the beginning in FIG. 1.

In this first embodiment the plunger 13 is not moved from the starting position into the final position by excess pressure, as in the second embodiment, but by the ram 16. The ram 16 which by means of the cartridge discharge device 34 is inserted from above into the cartridge 2 then pierces through the sealing element 18 and passes into the ram socket 14. The plunger is then moved towards the mixing chamber 8 by moving the ram 16 further inwards. The further sealing element 19 is hereby torn and the beverage substance 7 passes into the mixing chamber 8. Once the beverage production process has been completed the ram 16 is again driven out of the cartridge 2 so that the user can remove the cartridge 2 from the beverage preparation unit 3. The ram 16 is either rigid and is introduced vertically or inclined on a straight line from above.

Alternatively, the ram 16 is semi-rigid or flexible and is introduced from above into the cartridge 2 over a curved line so that the structural height of the beverage preparation unit 3 can be reduced. It is conceivable that the ram 16 is introduced automatically, by way of example by means of a motor, or handle or lever of the cartridge discharge device 34, which handle or lever is to be operated manually by the user.

Figure 5:
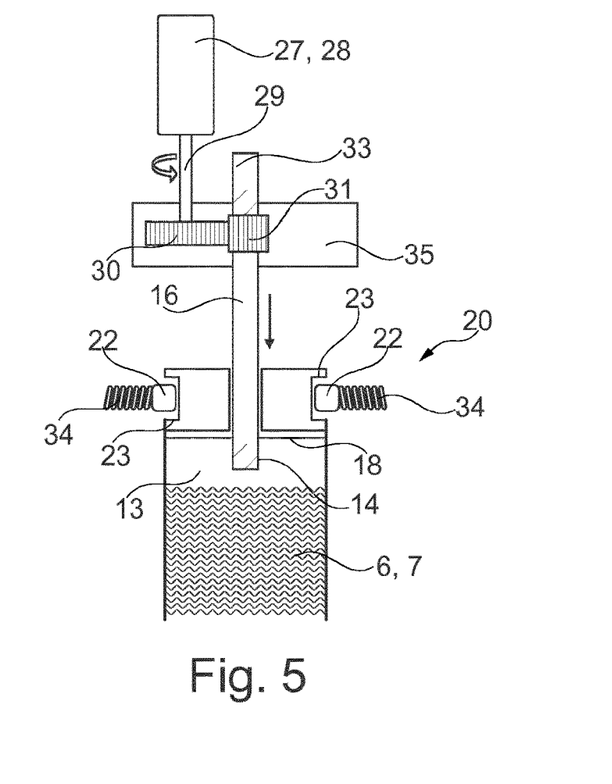
FIG. 5 shows a system and a method for the production of a beverage according to an exemplary third embodiment of the present invention.

FIG. 5 shows a system 1 and a method for the production of a beverage according to an exemplary third embodiment of the present invention. The third embodiment of the present invention is essentially the same as the first embodiment described with reference to FIGS. 1, 2a, 2b, 2c and 4.

In the beverage preparation unit 3 according to the third embodiment the cartridge discharge device 34 has an electric drive 27. The electric drive 27 comprises more particularly an electric motor 28 (by way of example a three-phase asynchronous machine or a three-phase synchronous machine) which drives a drive axis 29. A primary pinion 30 is seated on the drive axis 29. The primary pinion 31 meshes with a secondary pinion 32. The secondary pinion 32 has an inner gear rim which engages with a threaded spindle 33. The secondary pinion 32 is held in a guiding unit 25 which guides the threaded spindle 33 in rotation and longitudinal displacement (in a vertical direction). The threaded spindle 33 represents at the same time the ram 16. By rotating the drive axis 29 by means of the electric motor 28 the secondary pinion 31 is turned and depending on the turning direction the threaded spindle 33 moves down, thus into the cartridge 2, or upwards, thus out from the cartridge 2. In this way the plunger 13 can be moved from the starting position into the final position.

Alternatively, the drive comprises an electric linear motor with a pinion which sits on a drive shaft of an electric motor and engages in a gear rack, wherein the gear rack is coupled with the ram 16 or is already part of the ram 16. By turning the pinion, the gear rack is moved and thus the ram is moved into the cartridge or moved out from the cartridge.

FIG. 5 likewise clearly shows the upper form-fitting elements 20 which engage laterally on the cartridge 2. The upper form-fitting elements each comprise a detent element 22 which each engage by means of a compression spring 34 in a form-fitting and force-fitting manner into the corresponding recess 24 on the cartridge 2 in order to fix the cartridge 2 reversibly in the cartridge receptacle 10 at least during the beverage production process.

Figure 6A:
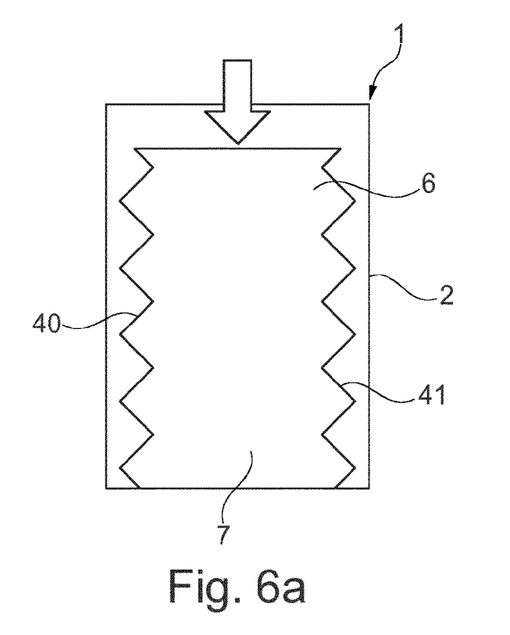
FIGS. 6a, 6b shows a system and a method for the production of a beverage according to an exemplary fourth embodiment of the present invention.
Figure 6B:
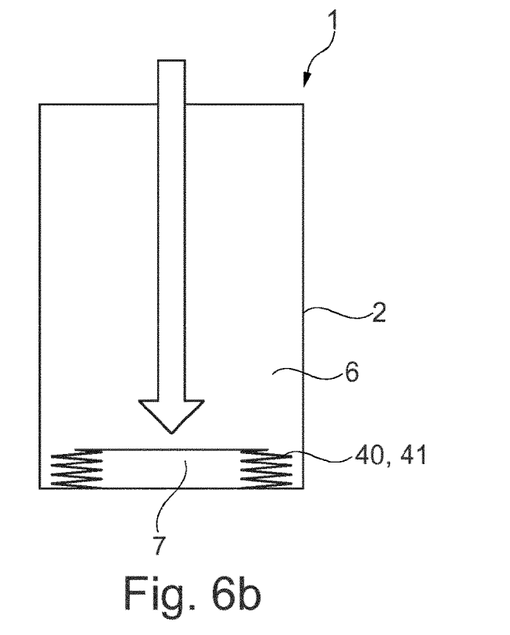

FIGS. 6a and 6b show a system 1 and a method for the production of a beverage according to an exemplary fourth embodiment of the present invention. The fourth embodiment essentially resembles the second and third embodiments illustrated in FIGS. 3 and 4, wherein a screen element 40 in the form of a bellows 41 is arranged inside the cartridge 2. The bellows 41 is attached to the output side 4 of the cartridge 2. The beverage substance 7 is arranged inside the bellows 41 so that the screen element 40 is always between the cartridge discharge device 34 and the beverage substance 7 and the cartridge discharge device 34 is isolated from the beverage substance 7 by means of the screen element 40.

This prevents recontamination of the beverage preparation machine 3 by the cartridge discharge device 34. In order that it is nevertheless possible to empty the reservoir 6 the screen element 40 is flexible and formed as a bellows 41. On emptying the reservoir 6 during the beverage production process the screen element 40 is moved towards the output side 5 by means of the cartridge discharge device 34 either by a ram 16 or by means of compressed air so that the beverage substance 7 is transferred from the reservoir 7 in the direction of the mixing chamber 8. The bellows 41 then collapses. The bellows 41 is more particularly made from a liquid-impermeable film material.

Figure 7A:
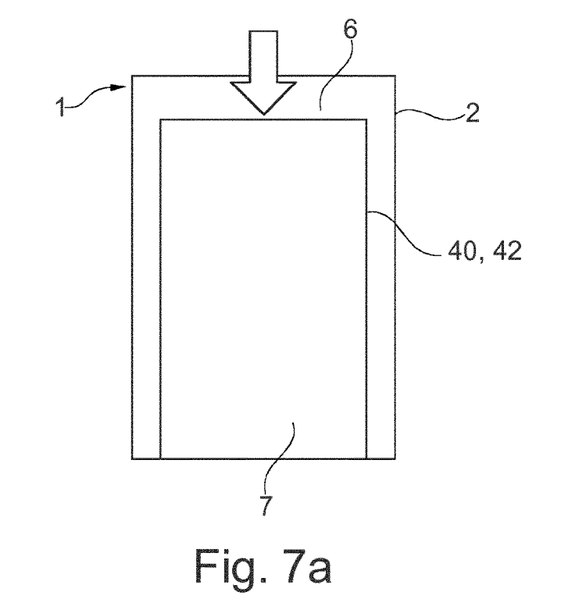
FIGS. 7a, 7b shows a system and a method for the production of a beverage according to an exemplary fifth embodiment of the present invention.
Figure 7B:
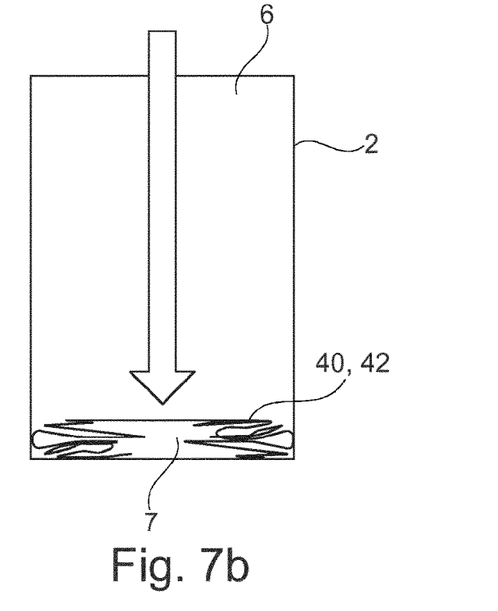

FIGS. 7a and 7b show a system 1 and a method for the production of a beverage according to an exemplary fifth embodiment of the present invention. The fifth embodiment essentially resembles the fourth embodiment illustrated in FIGS. 6a and 6b, wherein a screen element 40 is arranged inside the cartridge 2 not in the form of a bellows 41 but in the form of a soft bag element 42. Unlike the bellows 41 the bag element 42 does not ordinarily collapse but is simply compressed by the cartridge discharge device 34. The bag element 42 is more particularly made from a liquid-impermeable film material. As with the bellows 41 the bag element 42 is attached on the output side 4 of the cartridge 2 whilst the beverage substance 7 is arranged inside the bag element 42.

The present teachings envision any of the following features of a system for the production of a beverage, such as a cold beverage, a cartridge for a system, and/or a beverage preparation unit in any combination: a system for the production of a beverage, more particularly a cold beverage, comprising a cartridge which has a reservoir filled with a beverage substance, and a beverage preparation unit having a cartridge receptacle in which the cartridge can be reversibly inserted, and a cartridge discharge device which causes at least partial transfer of the beverage substance from the reservoir into a mixing chamber; the beverage preparation unit furthermore comprises a liquid supply which opens into the mixing chamber; the system comprises a movable plunger arranged inside the reservoir and can be transferred from a starting position into a final position by means of the cartridge discharge device; the plunger is arranged in the starting position close to the input side; the plunger is moved in the final position towards the output side; the plunger is arranged as part of the cartridge permanently in the reservoir or can be introduced as part of the cartridge discharge device into the reservoir after the cartridge has been inserted into the beverage preparation unit; the plunger has a sealing device, more particularly in the form of a flexible circumferential sealing lip or sealing bead, which seals a gap between a wall of the reservoir and the plunger; the cartridge discharge device comprises a movable ram which can be inserted on an input side of the cartridge into the cartridge in order to press the beverage substance out from the cartridge on an output side of the cartridge; the cartridge-side end of the ram comprises the plunger; the cartridge-side end of the ram is provided for interacting with the plunger arranged in the cartridge in such a way that during insertion of the ram into the cartridge the ram meets the plunger located in the starting position and is then moved by the ram into the final position; the cartridge has in the region of the insert side a sealing element which is opened by inserting the plunger wherein more particularly the sealing element has a sealing film which tears as the plunger is introduced; sealing film is arranged between the plunger located in the starting position, and the beverage substance, so that the sealing film is torn by the plunger as the ram is inserted; the plunger is arranged in the starting position between the sealing element and the beverage substance so that the sealing film is torn by the ram as the ram is inserted; the beverage preparation unit has a guiding unit for the motor-driven feed of the ram into the cartridge wherein the guiding unit for the ram comprises a straight or curved guide element for inserting the ram; the guiding unit has an electric or hydraulic linear motor and more particularly a spindle drive; the ram is of a rigid, semi-rigid or flexible design; the cartridge discharge device comprises a compressed air source for blowing compressed air into the reservoir on an input side of the cartridge; the system is more particularly configured in such a way that the beverage substance is pressed directly out from the reservoir by the compressed air, or that the plunger is transferred from the starting position into the final position by the compressed air; the cartridge discharge device comprises a negative pressure device for drawing the beverage substance out from the reservoir by means of negative pressure; the system is more particularly configured in such a way that the beverage substance is sucked directly out from the reservoir by the negative pressure, or that the plunger is transferred from the starting position into the final position by the negative pressure; the mixing chamber has a beverage outlet through which the beverage formed from mixing the beverage substance with the liquid is dispensed; the system is preferably configured in such a way that the beverage can be directed from the beverage outlet directly into a portable vessel; wherein the liquid supply is fed with liquid which is cooled by a cooling unit wherein the cooling unit is part of the beverage preparation unit or of a separate refrigerator which is in active connection with the beverage preparation unit; the cooling unit is a compressor chiller unit, absorber chiller unit or a thermo-electric chiller; the liquid supply is fed with liquid which is admixed with carbon dioxide by a carbonator; the carbonator is part of the beverage preparation unit; the carbonator has a receptacle for a $CO_2$ cartridge and a supply device for admixing the liquid with $CO_2$ from the $CO_2$ cartridge; the mixing chamber is formed as part of the replaceable cartridge; a further sealing element is arranged between the reservoir and the mixing chamber and is opened during insertion of the cartridge into the cartridge receptacle or during activation of the cartridge discharge device; the further sealing element comprises a sealing film which is opened, and more particularly torn, by a rise in pressure in the reservoir during transfer of the plunger from the starting position into the final position; the mixing chamber has a quick-fit coupling for connecting the mixing chamber with the liquid supply when the cartridge is inserted into the cartridge receptacle; the quick-fit coupling comprises a coupling pipe and a coupling socket which receives the coupling pipe in the coupled state; the coupling pipe and/or the coupling socket comprises a seal; in the coupled state the coupling pipe engages with detent action in the coupling socket; the coupling pipe is part of the beverage preparation unit and the coupling socket is part of the mixing chamber; the cartridge receptacle comprises a form-fitting element which holds the cartridge in a form-fitting manner; the cartridge is preferably held additionally by force-fitting action in the cartridge receptacle; the form-fitting element comprises at least one spring element and/or detent element which is compressed and/or engaged on inserting the cartridge into the cartridge receptacle; the cartridge receptacle preferably has a lead-in chamber and/or positioning aid; the cartridge receptacle comprises an upper form-fitting element which holds the cartridge in the region of its input side, and a lower form-fitting element which holds the cartridge in the region of the output side and/or the mixing chamber; the cartridge receptacle is configured in such a way that the cartridge has between the upper form-fitting element and the lower form-fitting element a diameter which is greater than or smaller than the diameter in the region of the upper and lower form-fitting elements; inside the cartridge there is arranged a screen element on which the cartridge discharge device acts in order to transfer the beverage substance from the reservoir into the mixing chamber; the screen element is arranged between the cartridge discharge device and the beverage substance; the screen element is a bellows or a soft bag element arranged inside the reservoir; the beverage substance is arranged inside the bellows or the soft bag element; the bellows or the soft bag element extends in the starting state from the output side at least partially parallel to the cartridge wall up to the input side and is moved by the cartridge discharge device towards the output side; a cartridge for a system for the production of a beverage wherein the cartridge can be inserted into a cartridge receptacle of a beverage preparation unit; the cartridge has a reservoir which is filled with a beverage substance; the cartridge has a plunger which is arranged in the reservoir and which can be moved between a starting position close to an input side of the cartridge, and a final position which is disarranged from the input side towards an output side; the plunger has a sealing device, more particularly in the form of a flexible circumferential sealing lip which seals a gap between a wall of the reservoir and the plunger; the plunger has a ram socket for receiving a ram of the beverage preparation unit; the plunger is configured to be transferred from the starting position into the final position by inserting the ram into the reservoir so that the beverage substance is directed from the reservoir into a mixing chamber arranged in the liquid direction behind the reservoir and more particularly underneath the reservoir; the cartridge has in the region of the insert side a sealing element which is opened by the insertion of the plunger; the sealing element more particularly comprises a sealing film which tears as the plunger is inserted; the cartridge has a mixing chamber which can be brought into liquid connection with a liquid supply of the beverage preparation unit; the mixing chamber has a beverage outlet through which the beverage which is formed from mixing the beverage substance with the liquid is dispensed; the system is configured in such a way that the beverage can be introduced from the beverage outlet directly into a portable vessel; the mixing chamber has a quick-fit coupling for connecting the mixing chamber to the liquid supply; between the reservoir and the mixing chamber there is arranged a further sealing element which is opened during insertion of the cartridge into the cartridge receptacle or during activation of the cartridge discharge device; the further sealing element comprises a sealing film which is opened and more particularly torn by a rise in pressure in the reservoir when transferring the plunger from the starting position into the final position; the cartridge has at least one connecting element which during insertion of the cartridge into the beverage preparation unit interacts with the cartridge receptacle in order to hold the cartridge in the cartridge receptacle; the connecting element comprises an insert element which engages in a form-fitting element, more particularly in the form of a spring and/or detent element; the cartridge comprises an upper connecting element in the region of the input side and a lower connecting element in the region of the output side and/or the mixing chamber; the cartridge has in an intermediate region between the input side and the output side a diameter which is greater than or less than the diameter of the cartridge in the region of the input side and/or output side; the diameter of the cartridge in the region of the input side is substantially identical to the diameter of the cartridge in the region of the mixing chamber and/or the output side; a screen element is arranged inside the cartridge; the screen element preferably comprises a bellows or a soft bag element arranged inside the reservoir; the beverage substance is arranged inside the bellows or the soft bag element; a beverage preparation unit for a system for the production of a beverage, wherein the beverage preparation unit has the cartridge receptacle in which the cartridge can be reversibly inserted, a cartridge discharge device which causes an at least partial transfer of the beverage substance from the reservoir into a mixing chamber, and the liquid supply which opens into the mixing chamber; the beverage preparation unit comprises a cooling unit for cooling a liquid which is supplied to the liquid supply; the cartridge discharge device has a movable ram which can be inserted into the cartridge on the input side of the cartridge in order to press the beverage substance out from the cartridge on an output side of the cartridge; the beverage preparation unit has a guiding unit for the motor-driven feed of the ram into the cartridge; wherein the guiding unit of the ram comprises a straight or curved guide element for inserting the ram; the guiding unit has an electric or hydraulic linear motor and more particularly a spindle drive; the beverage preparation unit comprises the mixing chamber; the mixing chamber can be removed from the rest of the beverage preparation unit.

The present teachings also envision a method for producing a beverage with a cartridge system having any of the following steps or elements in any combination: inserting a cartridge filled with a beverage substance into a cartridge receptacle of a beverage preparation unit; transferring the beverage substance from a reservoir of the cartridge into a mixing chamber by means of a cartridge discharge device; feeding a liquid into the mixing chamber by means of a liquid supply; discharging the beverage, produced in the mixing chamber by mixing the beverage substance with the liquid, by means of a beverage outlet; wherein the beverage substance is pressed by a plunger out from the reservoir into the mixing chamber by moving the plunger from a starting position into a final position by means of the cartridge discharge device; wherein the plunger is moved by means of a cartridge discharge device in the form of a ram acting on the plunger or by means of compressed air; wherein the ram is introduced into the cartridge motor-driven by means of a guiding unit and acts on the plunger in order to move the plunger from the starting position into the final position; wherein the beverage substance is transferred from the reservoir into the mixing chamber by compressed air or negative pressure; wherein the liquid is cooled and/or carbonated prior to entering into the mixing chamber; wherein a sealing element sealing the cartridge is opened as the ram is introduced into the cartridge; wherein the sealing element preferably comprises a sealing film which is torn by the ram; wherein a further sealing element which between the reservoir and the mixing chamber is opened by transferring the beverage substance in the direction of the mixing chamber; wherein the further sealing element preferably comprises a sealing film which is torn by the rise in pressure in the reservoir; wherein the cartridge discharge device acts on a screen element arranged inside the cartridge in order to transfer the beverage substance from the reservoir into the mixing chamber; wherein the screen element is folded or compressed during this action.

REFERENCE NUMERAL LIST

1 System
2 Cartridge
3 Beverage preparation unit
4 Input side
5 Output side
6 Reservoir
7 Beverage substance
8 Mixing chamber
9 Transfer opening
10 Cartridge receptacle
11 Beverage outlet
12 Liquid supply
13 Plunger
14 Ram socket
15 Sealing device
16 Ram
17 Ram opening
18 Sealing element
19 Further sealing element
20 Upper form-fitting element
21 Lower form-fitting element
22 Detent element
23 Counter detent element
24 Receptacle
25 Flange
26 Quick-fit coupling
27 Electric drive
28 Electric motor
29 Drive axis
30 Primary pinion
31 Secondary pinion
32 Threaded spindle
33 Compression spring
34 Cartridge discharge device
35 Guiding unit
40 Screen element
41 Bellows
42 Bag element

The invention claimed is:
1. A system for the production of a beverage comprising:
a cartridge which has a reservoir filled with a beverage substance;
a beverage preparation unit having a cartridge receptacle in which the cartridge can be reversibly inserted; and
a cartridge discharge device which causes at least partial transfer of the beverage substance from the reservoir into a mixing chamber;
wherein the beverage preparation unit furthermore comprises a liquid supply which opens into the mixing chamber;

wherein the system comprises a movable plunger which is placed inside the reservoir and can be transferred from a starting position into a final position by means of the cartridge discharge device;

wherein the plunger can be introduced as part of the cartridge discharge device into the reservoir after the cartridge has been inserted into the beverage preparation unit;

wherein the cartridge discharge device comprises a movable ram which can be inserted on an input side of the cartridge into the cartridge in order to press the beverage substance out from the cartridge on an output side of the cartridge;

wherein the cartridge-side end of the ram comprises the plunger;

wherein the cartridge has in a region of an insert side a sealing element which is opened by inserting the plunger;

wherein the sealing element has a sealing film which tears as the plunger is introduced; and wherein the sealing film is arranged between the plunger located in the starting position, and the beverage substance, so that the sealing film is torn by the plunger as the ram is inserted.

2. The system as claimed in claim 1, wherein the plunger is arranged in the starting position close to the input side, and wherein the plunger is moved in the final position towards the output side.

3. The system as claimed in claim 1, wherein the plunger has a sealing device in a form of a flexible circumferential sealing lip or sealing bead, which seals a gap between a wall of the reservoir and the plunger.

4. The system as claimed in claim 1, wherein the beverage preparation unit has a guiding unit for the motor-driven feed of the ram into the cartridge wherein the guiding unit for the ram comprises a straight or curved guide element for inserting the ram, and wherein the guiding unit has an electric or hydraulic linear motor and/or a spindle drive.

5. The system as claimed in claim 1, wherein the mixing chamber has a beverage outlet through which the beverage formed from mixing the beverage substance with the liquid is dispensed, wherein the system is configured in such a way that the beverage can be directed from the beverage outlet directly into a portable vessel.

6. The system as claimed in claim 1, wherein the liquid supply is fed with liquid which is cooled by a cooling unit wherein the cooling unit is part of the beverage preparation unit or of a separate refrigerator which is in active connection with the beverage preparation unit.

7. The system as claimed in claim 6, wherein the cooling unit is a compressor chiller unit, absorber chiller unit or a thermo-electric chiller.

8. The system as claimed in claim 1, wherein the liquid supply is fed with liquid which is admixed with carbon dioxide by a carbonator.

9. The system as claimed in claim 8, wherein the carbonator is part of the beverage preparation unit, and wherein the carbonator has a receptacle for a $CO_2$ cartridge and a supply device for admixing the liquid with $CO_2$ from the $CO_2$ cartridge.

10. The system as claimed in claim 1, wherein the mixing chamber is formed as part of the cartridge.

11. The system as claimed in claim 10, wherein a further sealing element is placed between the reservoir and the mixing chamber and is opened during insertion of the cartridge into the cartridge receptacle or during activation of the cartridge discharge device.

12. The system as claimed in claim 11, wherein the further sealing element comprises a sealing film which is opened by a rise in pressure in the reservoir during transfer of the plunger from the starting position into the final position.

* * * * *